US008668483B2

(12) United States Patent
Mercado et al.

(10) Patent No.: US 8,668,483 B2
(45) Date of Patent: Mar. 11, 2014

(54) FACILITY FOR PRODUCING A SOLID PRODUCT USING ONE OR MORE POWDER MATERIALS

(75) Inventors: Henri Mercado, Saint Denis les Bourg (FR); Bruno Villa, Saint Didier Au Mont d'Or (FR)

(73) Assignee: Medelpharm (FR)

( * ) Notice: Subject to any disclaimer, the term of this patent is extended or adjusted under 35 U.S.C. 154(b) by 0 days.

(21) Appl. No.: 13/456,846

(22) Filed: Apr. 26, 2012

(65) Prior Publication Data

US 2012/0207867 A1 Aug. 16, 2012

Related U.S. Application Data

(63) Continuation of application No. PCT/FR2010/052314, filed on Oct. 28, 2010.

(30) Foreign Application Priority Data

Oct. 30, 2009 (FR) ..................................... 09 57643

(51) Int. Cl.
*B29C 43/02* (2006.01)

(52) U.S. Cl.
USPC .............................. 425/78; 425/138; 425/355

(58) Field of Classification Search
USPC ........... 425/78, 138–141, 149–150, 344–345, 425/349, 354–356
See application file for complete search history.

(56) References Cited

U.S. PATENT DOCUMENTS

| | | | | |
|---|---|---|---|---|
| 3,158,109 | A | 11/1964 | Stott | |
| 4,104,014 | A | 8/1978 | Pearce | |
| 5,211,964 | A * | 5/1993 | Prytherch et al. | 425/140 |
| 5,906,837 | A * | 5/1999 | Link et al. | 425/78 |
| 6,106,262 | A * | 8/2000 | Levin et al. | 425/140 |
| 6,442,859 | B1 * | 9/2002 | Hinzpeter et al. | 33/645 |
| 7,988,440 | B2 * | 8/2011 | Schmidt et al. | 425/150 |
| 8,186,988 | B2 * | 5/2012 | Baltruschat et al. | 425/78 |
| 8,302,452 | B2 * | 11/2012 | Golorans et al. | 72/443 |

FOREIGN PATENT DOCUMENTS

| | | | |
|---|---|---|---|
| EP | 0358770 | A1 | 3/1990 |
| EP | 0893239 | A1 | 1/1999 |
| FR | 2791602 | A1 | 10/2000 |
| FR | 2855094 | A1 | 11/2004 |
| SU | 935313 | A1 | 6/1982 |
| WO | 2008104969 | A1 | 9/2008 |

OTHER PUBLICATIONS

International Search Report; Application No. PCT/FR2010/052314; Issued: Feb. 25, 2011; Mailing Date: Mar. 18, 2011; 3 pages.

* cited by examiner

*Primary Examiner* — Joseph S. Del Sole
*Assistant Examiner* — Thukhanh Nguyen
(74) *Attorney, Agent, or Firm* — St. Onge Steward Johnston & Reens LLC

(57) ABSTRACT

A facility for using powder materials to produce a solid product having multiple layers includes a supply of powder material(s), a die for receiving the powder material(s) and shaping the solid product, the die being secured in a reversible manner to a die-holding table secured to the frame of the facility, and translatable upper and lower punches that engage with one another at the die to compress the powder material(s). The lower punch is connected to a system for uncoupling the members that provide the movement thereof, the system having a brake for limiting the downward travel of the lower punch to keep it in contact with the powder material contained in the die when producing the solid product to avoid the generation of additional compression during the receipt of powder material in the die during the intermediate filling phases for each layer of the product.

19 Claims, 5 Drawing Sheets

FACILITY FOR PRODUCING A SOLID PRODUCT USING ONE OR MORE POWDER MATERIALS

CROSS-REFERENCE TO RELATED APPLICATIONS

The present application is a continuation of pending International Patent Application PCT/FR2010/052314, filed on Oct. 28, 2010, which designates the United States and claims priority from French Patent Application 0957643, filed on Oct. 30, 2009, the content of which is incorporated herein by reference.

FIELD OF THE INVENTION

The invention relates to a facility for producing, from one or more powder materials, a solid, single layer or multiple layer product.

It falls more specifically within the fields of pharmaceuticals and chemicals, in the context of the automated manufacture of pills, tablets and other doses that are able to incorporate one or more active ingredients.

BACKGROUND OF THE INVENTION

Producing solid products using powder products traditionally involves compressing the basic powder material in a die, said compression being obtained by means of punches sliding in said die, said die giving the finished solid product the required shape.

To meet the requirements of research and development, with the aim of perfecting presses that simulate industrial presses or for some specific applications, single-punch presses that operate slowly and use a small quantity of powder have been developed. Each of said punches, upper and lower respectively, is motorised, using a crank and rod member for example, so that the travel height of said punches, and in consequence, the compression rate, can be varied. In such facilities, the die is filled with powder by specific positioning of the lower die, and compression is obtained by actuating the upper punch so as to bring it down into said die.

Apart from the fact that employing a punch actuation system of this kind comes with a high level of inertia and a low speed relative to manufacturing machines, problems of reliability are also observed in terms of the cohesion of the resulting solid product, in so far as said product is frequently seen to burst, or to suffer from a lack of cohesion, translating into a return to powder form. In all cases, these presses are characterised by the fact that they simulate imperfectly, or even not at all, the phenomena occurring in industrial production presses.

Tablet manufacturing machines typically vary the translation height of the punches using a continuous system for rotating the punches using a turret and for compressing using rollers. This device is more difficult to use in R&D because of the minimum volume of powder needed and because of the mechanical stresses that this type of rotary press imposes on the tablet.

To dispense with these drawbacks, a first proposal has been made, for example in document FR-A-2 791 602, for a device that includes respective drive means for the upper and lower punches respectively, and that employs transmission means interposed kinetically between motor means and said punches, these transmission means each incorporating a cam. In so doing, the sinusoidal movement of prior art punches is eliminated by a linear movement that promotes the compression phase. Additionally, the use of cams allows the punch stroke rate to be modified in a straightforward manner as a function of the nature of the powder products used, thereby promoting device adaptability.

Another proposal has been made in document FR-A-2 855 094 for a development of this prior art. Said development comprises providing at least one of the two cams of the device previously described with a deformable external profile, intended to induce particular actions at least of the lower punch at the die, and particularly to promote the ejection of the product from the die after production. The compression rate of this system is then similar to that of industrial manufacturing presses.

Even if this development does unquestionably constitute a significant improvement relative to prior art devices, (extremely expensive hydraulic presses), it proves however to be complex to produce and expensive to manufacture.

The objective set by this invention is to propose a device of the type in question, which is both more straightforward, and therefore less expensive, to produce, and offers some reliability in terms of compression.

Additionally, it relates to a device for the manufacture of solid products that come in the form of multiple layer tablets for the purpose of perfecting the production lines of said solid products from powder materials.

The production of said multiple layer products is prone in fact to a certain number of problems, including the maintenance of the cohesion of each of the intermediate layers, the function of dosing by an adapted movement of the intermediate layers and the risk of the products constituting said layers getting mixed.

In fact, the devices known hitherto do not allow such multiple layer tablets to be produced reliably, in other words, without the risk of one, or even more, of the intermediate layers returning to the powder state, or while disregarding the proportioning/levelling function.

SUMMARY OF THE INVENTION

The invention thus relates to a facility for producing a solid product using one or more powder materials, including:

- means for supplying powder material(s);
- a die for receiving said powder material(s), and for shaping the solid product to be produced, secured in an advantageously reversible manner to a die-holding table secured to the frame of the facility;
- an upper punch and a lower punch, suitable for engaging with one another at said die in order to compress the powder material(s) and produce the solid product.

According to the invention the lower punch is connected to a system for uncoupling the means or members that provide the movement thereof, said system in turn being provided with a brake, suitable for limiting the travel of said punch in the downward direction in order to keep said punch in contact with the powder material contained in the die when producing the solid product, in particular having multiple layers, and in consequence, in order not to generate additional compression during the movement of the various mixtures of powder product into the die during the intermediate filling phases for each layer of product.

In other words, the lower punch enjoys some freedom or some play relative to the member or members providing the movement thereof, said play extending obviously in the same direction as the direction of movement of said piston. The purpose of the abovementioned brake is to counterbalance the weight of said piston, so that, during stages of filling and compacting the powder material, in particular for producing multiple layer tablets, the upper end of said piston can be kept systematically in contact with the powder product then added and so that, by the adjustment thereof, the compaction induced by the movement can be proportioned.

According to a first alternative of the invention, the upper punch is translatable only between two positions, up and down respectively, said upper punch being static during the compression phases(s). This alternative is straightforward to produce and to employ, and consequently inexpensive while allowing the production of multiple layer tablets.

In other words, according to this first alternative, the upper punch has no positive role to play during the compression stage(s), this role being allotted to the lower punch alone. The upper punch therefore merely performs a counter-reaction function when the lower punch is actuated. The additional role played by the upper punch in aiming to compact the powder material then introduced into the die, either in contact with the lower layer produced during the previous compression stage, or in contact with the upper end of the lower punch when producing the first layer, will be described as part of the detailed description of the invention.

In so doing, the problems inherent in single-punch R&D presses wherein the lower punch is not mobile during the filling phases and wherein the compression is applied by the upper punch, are resolved. Indeed a fixed lower punch does not allow overdosage through excess filling with powder and then proportioning by rising upwards again prior to levelling. At the same time an entirely free lower punch would not maintain contact with the powder bed and would generate a rupture of the powder bed preventing the correct proportioning of each layer, and the separation thereof.

According to another alternative of the invention, the movement of the upper punch is controlled at all times, thereby giving more flexibility and the possibility of having a fixed or mobile upper punch during the compression phase.

To advantage, the lower punch is translatable at the die by means of a ball or roller screw actuated by an electric motor.

In this instance, said lower punch is therefore translatable upward or downward, by means directly acting in direct drive on said punch, in the absence of any intermediate element of the cam or cardan coupling type or the like. The use of a ball or roller screw system of this kind gives high power along a reduced distance, and in consequence generates very low inertia, suitable for promoting the compression cycles over an exceptionally short period of time. Incidentally, the load and therefore pressure capacity able to be applied may reach very high values, and typically in excess of 10 tonnes.

Additionally, the compression is applied by the lower punch unlike all prior art devices which use compression via the upper punch. The main advantages of the invention therefore lie in controlling apportionment by moving the lower punch and in the possibility of manufacturing multiple layer tablets by associating therewith disengagement of said lower punch with a brake.

To this end, the lower punch is connected to a lower carriage, which is translatable, in this instance upward and downward, and guided at ball guide pillars mounted in the frame receiving the facility in question.

In so doing, because of the precision of such ball pillars, the punch as such no longer needs to be guided, said guiding being inherent solely in guiding the carriage to which it is secured on said ball guide pillars.

According to the first alternative of the invention, and as already stated, the upper punch is only mobile between two positions, up and down respectively. This movement is provided by means of a crank and rod system, the up position being used when supplying the die with the powder material(s) and when ejecting the solid product from the die.

However, according to the other alternative of the invention, the upper punch may in turn be subject to the action of a ball or roller screw system, also actuated by an electric motor, when it is required to make the compression cycle more complex. The advantages inherent in the employment of said system are identical to those described in relation to the lower punch. This combination of motions is used to advantage to simulate the movement of the punches on rotary manufacturing presses with very little powder material.

The electric motor(s) actuating the ball or roller screw is of the brushless type and is/are to advantage coupled to a programmable variator, so as to control and synchronise the movement of the lower punch and, where appropriate, of the upper punch.

To advantage, the carrier of the lower and upper punches is provided with a force sensor for measuring the rate of compression applied and for regulating the facility.

Additionally, a system for measuring the respective movements of the punches may also be employed, in order to control the position of the upper and lower punches. In this instance, this measurement system may be constituted by one or more linear punch movement measurement sensors, for determining the respective position of the lower and upper punches, and in consequence the height of filling of the die with powder material and the thickness of the solid product produced.

BRIEF DESCRIPTION OF THE DRAWINGS

The manner in which the invention may be embodied and the resulting advantages will become clearer from the following embodiment examples, given for information purposes and non-restrictively, supported by the appended figures.

DETAILED DESCRIPTION OF THE INVENTION

The following description is geared more specifically towards the production of tablets for medical use. It is however understood that the invention is not restricted to this application alone.

Figure 1:
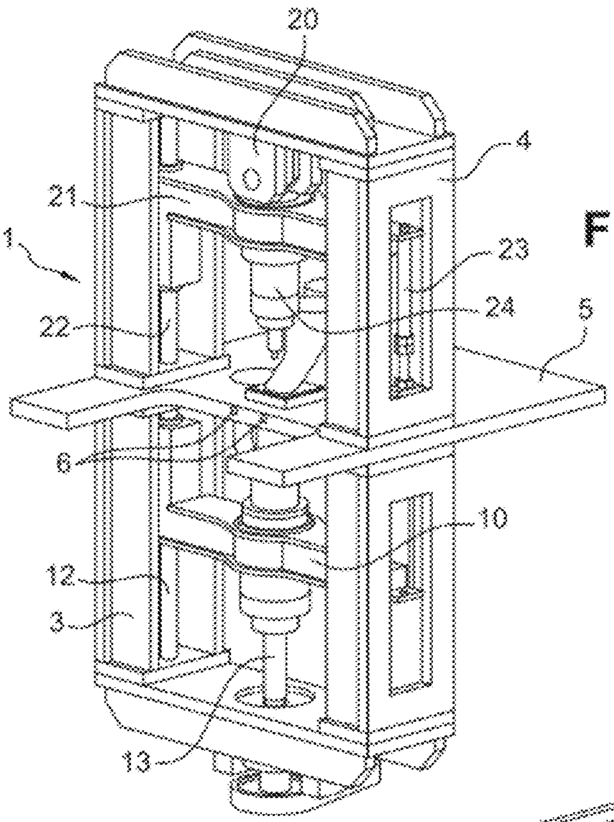
FIG. 1 is a diagrammatic perspective view of the facility in accordance with a first embodiment of the invention.
Figure 2:
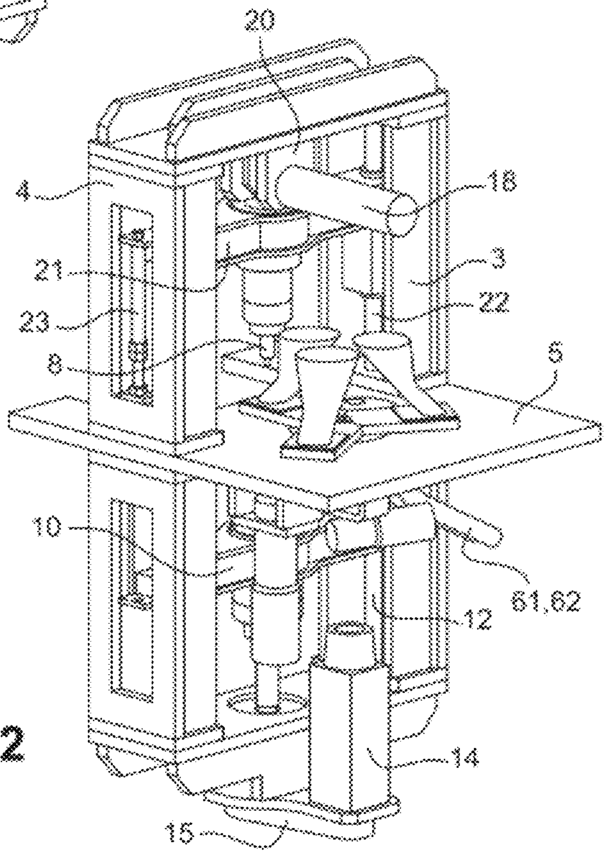
FIG. 2 is a view similar to FIG. 1 seen from another angle.

A perspective view has been shown in relation to FIGS. 1 and 2 of one embodiment of the invention.

This facility basically includes a frame (1), and in particular a metal frame, resting on the ground by means of a base-plate. Said frame (1) comprises a vertical guide system ensuring the precision of the movement of the punches as described hereinafter. In this instance, said system comprises two hollowed-out vertical pillars (3, 4), for accommodating the means for guiding the essential movable members of the facility. These two pillars (3) and (4) are added on either side of a table (5), one of the prime functions of which is to secure the die in which the solid products in accordance with the invention are intended to be produced. To this end, it comprises two bores (6) provided in the thickness thereof, and each suitable for receiving a screw for fixing a die-holder, thereby allowing die interchangeability and, as a consequence, allowing the facility to be adapted to the required shape of the solid product.

According to the invention, the facility comprises a lower punch (7) and an upper punch (8) intended to engage in a die (9), in order to compress the powder material previously introduced into the die and in consequence produce a solid product, and in this instance a tablet.

To this end, the lower punch (7) is connected to a movable carriage (10) able to move between the pillars (3) and (4) of the frame. To be more specific, this movable carriage is provided at the two ends thereof with ball guides (11) engaging with two guide pillars (12) parallel to one another and secured in the pillars (3) and (4) respectively. Given the precision of these ball guides, it is possible to dispense with any system for guiding the actual punch, the settings being provided at the construction stage.

The movable carriage (10) is moved in upward or downward translation by means of a ball or satellite roller screw (13), which in turn is rotated by means of a brushless electric motor (14). To this end, it is secured at the lower end thereof to a pulley (16) rotated by said motor (14) by means of a toothed drive belt (15).

The ball or satellite roller screws are of a type known per se, so there is no need to describe them here in further detail. Suffice it simply to recall that they constitute a mechanism for converting rotary motion into translatory motion along a helical connection. They allow a transmission of power while providing the precision required in terms of movement of said translation.

In so doing, it becomes possible, in cooperation with the brushless motor, to have a very great flexibility and to ensure by the rotary motion of the screw (13) a translation along a short distance, while providing the required transfer of power. In this instance, the compression force exerted by the lower punch is able to exceed more than 10 tonnes of pressure.

According to one essential feature of the invention, the lower punch (7) is connected to a disengagement and brake system (39), in this instance constituted by an adjustable spring acting radially on said punch, intended to restrict the travel thereof in the downward direction. This principle has been shown in FIG. 6. In so doing, the lower punch is in contact with the screw (13) and the lower movable carriage (10) only in an upward direction, said screw (13) and the movable carriage (10) being able by this disengagement system to drop back down by a set length without action on said punch, said punch being held by the spring-brake (39), which is moreover adjustable, in order to keep the punch in contact with the powder and perform thereupon a first compaction of adjustable intensity. This is done in order not to destroy the cohesion of each of the layers constituting a multiple layer tablet during the subsequent phases of filling the die with powder, in order to produce the upper layers. In other words, the lower punch (7) enjoys play in the direction of its movement. It is not therefore secured to the members providing the movement thereof, and in this instance to the movable carriage (10), said carriage only coming into contact with the lower end of the punch during the compression, proportioning and ejection phases.

Figure 6:
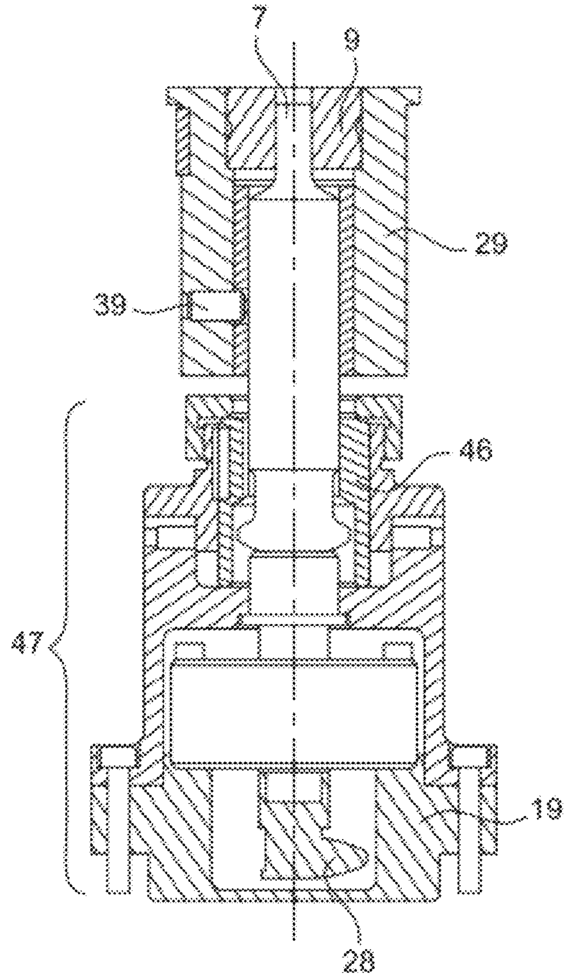
FIG. 6 is a diagrammatic view in transverse cross-section of a detail of the facility in FIGS. 1 and 2.

It may be further observed in FIG. 6, and furthermore in the figures numbered as 8, that the play of the punch (7) is restricted, and typically by a height of 8 millimeters, (in this instance constituting the standard height in the industry for the penetration of the upper punch), through the engagement of the base (45) of said punch with an adaptor (46), intended to allow punch interchangeability as a function of the die employed, said adaptor being in turn secured to the unit incorporating the sensor carrier (19).

It may also be seen in FIG. 6 that all the elements grouped under the reference number (47) are subjected to the action of the screw (13) and lower movable carriage (10).

According to a first inventive embodiment, the upper punch (8) only performs the counter-reaction function when it engages with the lower punch (7) in the die. In so doing, and in this embodiment, it is driven in an upward motion only so that the die can be filled with powder product and the tablet ejected once produced. It is driven in a downward motion and only penetrates into the die to take up its position without exerting any significant force (Cf. above). It thus operates on the "on-off" principle using a crank and rod assembly (20), actuated by an electric motor (18), and acting on an upper carriage (21), in turn received at the guide pillars (22) like the lower carriage (10).

However, said upper carriage (21) is also received, unlike the lower carriage, on external springs (23) so as to balance the weight of the whole. Thus, two adjustable compression springs (23) are secured to the carriage (21) at each of the ends thereof in order to balance the carriage assembly and fittings thereof. Moreover this device provides security against the carriage falling in the event of a failure in the electrical system.

The operation of the inventive device for the production of a bi-layer tablet has been described in the figures numbered as 8.

Figures 8A, 8B, 8C, 8D, 8E, 8F, 8G, 8H, 8I, 8J, 8K, 8L, 8M:
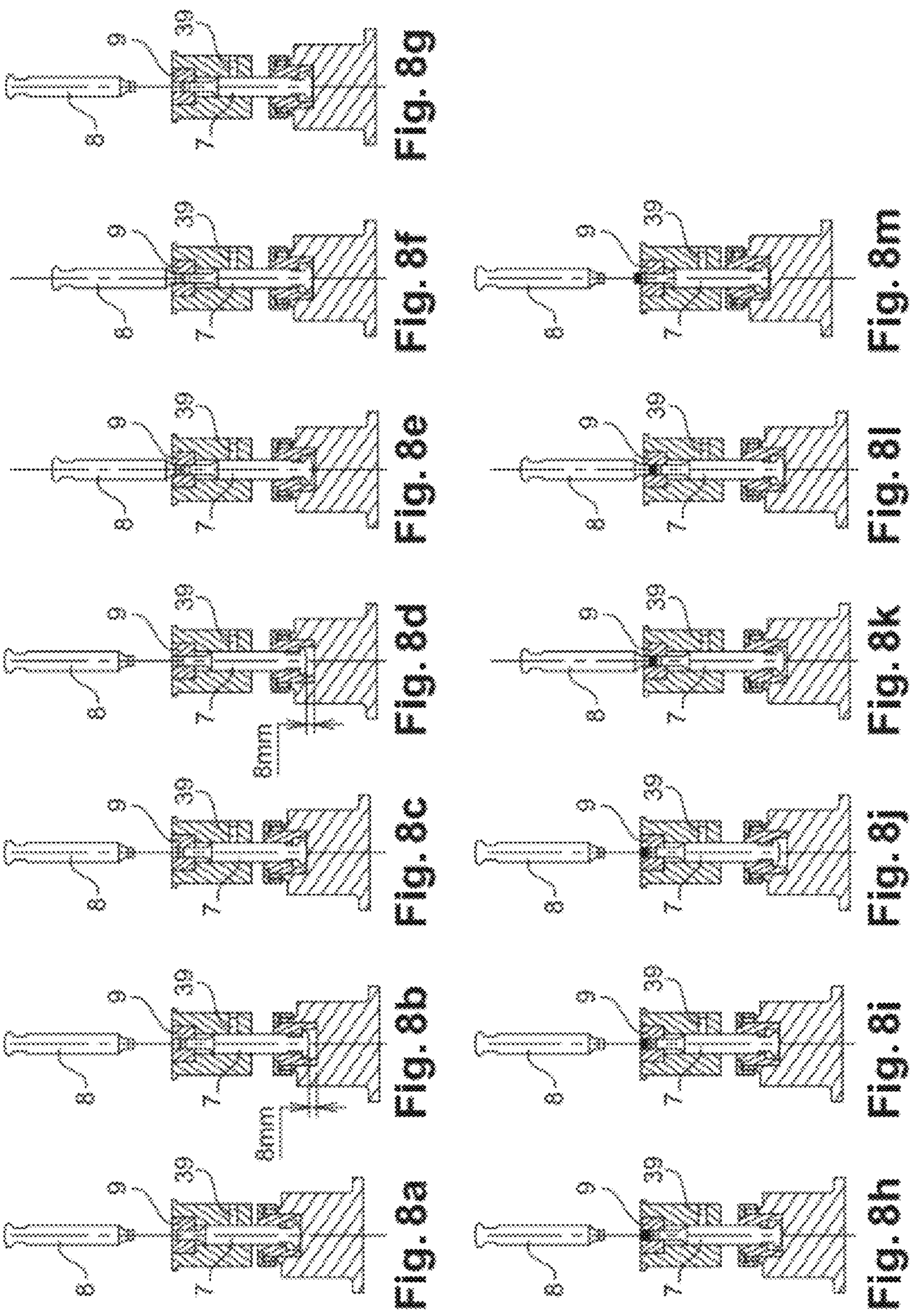
FIGS. 8*a* to 8*m* are diagrammatic views of a manufacture of a bi-layer tablet using the facility of the invention.

FIG. 8*a*: stage zero, i.e. a stage preceding the production of said tablet has ended with the ejection of the tablet obtained: the upper end of the lower punch (7) is flush with the upper face of the table (5), and in consequence, with the upper end of the die. The upper punch (8) is in the up position, to enable said ejection stage.

FIG. 8*b*: The upper punch is kept in the up position, and in consequence, the members providing the movement of the lower punch are lowered. Given the disengagement of these members relative to the punch, as well as the presence of the brake (39), said lower punch is lowered only partially, sufficiently at all events to release the volume needed to be filled with the powder material constituting the lower layer of the bi-layer tablet to be produced.

FIG. 8*c*: the members providing the movement of the lower punch (7) rise, so as to induce the upward thrust thereof, and in consequence, to allow the proportioning and levelling of excess powder material.

FIG. 8*d*: the members for moving the lower punch are again brought down, but said punch remains substantially in place, because of the brake and disengagement thereof relative to said members.

FIG. 8*e*: the upper punch (8) is brought down, penetrates into the die, providing a "slight" compacting of the material contained in the die, the lower punch coming down gently, slowed down in so doing by the brake regulating which controls the intensity of compaction.

FIG. 8*f*: compression stage: the lower punch is raised under the action of the members providing the movement thereof, and in consequence, the upper punch, then in the down position, provides the counter-reaction: the first layer of the tablet is thus produced.

FIG. 8*g*: the upper punch is raised into the up position, without the lower piston being released from the members providing the progression thereof: it therefore remains in its place.

FIG. 8*h*: because of the retraction of the upper punch, access is released to the die, whereof the volume is partially filled with said lower layer of the tablet: a new stage of filling said die with a second powder material is carried out.

FIG. 8*i*: new levelling stage: identical to the stage in FIG. 8*c*.

FIG. 8*j*: identical to FIG. 8*d*: the lower punch is released from the action of the members providing the movement thereof, but is kept in place by the brake (39).

FIG. 8*k*: identical to FIG. 8*e*: gentle compaction of the second powder material in contact with said lower layer, subsequent to dropping the upper punch into its down position.

FIG. 8*l*: identical to FIG. 8*f*: compression of the second layer of the tablet by raising the lower punch, with an applied force able to reach 10 tonnes.

FIG. 8*m*: the upper punch is repositioned in its up position, and the lower punch rises in its turn, pushing the bi-layer tablet so produced out of the die, then enabling the ejection thereof.

It may thus be seen that when producing said multiple layer tablets, after producing the first layer or lower layer, the upper punch (8), after being retracted to allow the introduction of a new quantity of powder material suitable for constituting the second layer, and then re-inserted into the die, induces the movement inside the die, and therefore in a downward direction, of the pre-compressed powder bed so produced, when the lower punch adopts its down position. This positioning is obtained by using the freedom introduced by the system. Thus, the movement exerted by the upper punch in contact with the powder when it drops translates into dropping the tablet in process of production into the die without applying any significant force, i.e. only the low level of force of the brake (39) to be overcome, and allowing the tablet currently underway to be re-positioned with no detriment to the cohesion thereof.

The brushless motor connected to the ball screw allows the movement of the associated punch to be programmed and controlled. This control associated with the synchronisation of the two punches allows punch movement over time to be reproduced, allowing the reproduction of the movements of the elements of the so-called rotary machines during the various phases of production of the tablets.

Indeed, compression problems are inherent to the behaviour of the powder material when said material is subjected to pressure, in this instance compaction to produce a solid product. Thus, each powder or powder material reacts differently to the movements of the punches (reduction in volume of the powder bed in the die), and therefore in consequence to the pressure applied. It is appropriate therefore to be able to act on the movement of the punches, and in the embodiment described of the lower punch as a function of the force measured in the powder.

This force is only the reaction force of the powder to the reduction in volume imparted by the relative movement of the punches.

Thus, some powder materials react very early: the contact of said material with the punch creating a high level of compaction and a high level of force with very little movement in the powder bed.

Other powder materials allow a reduction in volume by air discharge without however resulting in pellet cohesion or generating any resulting force before significant movement in the powder bed.

An external system, typically constituted by control electronics to which the measurements made by the sensors are sent, controls the force and the movement of the punches, and at the very least of the lower punch, thereby making it possible to influence said movement as a function of the resulting measured compression force (for example movement stopped as soon as a level of force is attained).

To this end, the carriage (10) receives a sensor carrier (19) incorporating an actual force sensor (28), typically constituted by a strain gauge, and allowing the force exerted by the lower punch to be set.

Additionally, the brushless motor (14) is fitted with a brake or a torque maintainer, able to oppose a torque close to 80 N/m. This brake may be incorporated into the motor or be external thereto, in a known way.

The system can thus be used to control the movement of the lower punch as a function of the two modes of behaviour of the powder materials described above.

In terms of the upper punch, here too, a sensor carrier (24) is secured to the carriage (21) incorporating an actual force sensor of a similar type to the one connected to the lower carriage (10) and making it possible to determine in cooperation therewith the strain and therefore the pressure exerted on the powder material, and in consequence the movement of said lower punch.

This first embodiment equates to a simplified mode of the inventive facility. It employs the essential principle specified by the invention, namely the downward compression of the powder material, associated with a system of braking and disengagement of the lower punch, which is particularly innovative relative to the prior art.

In this configuration, the lower punch (7) can be used to provide the phases of filling/proportioning, via the free travel thereof, and of compression.

Figure 3:
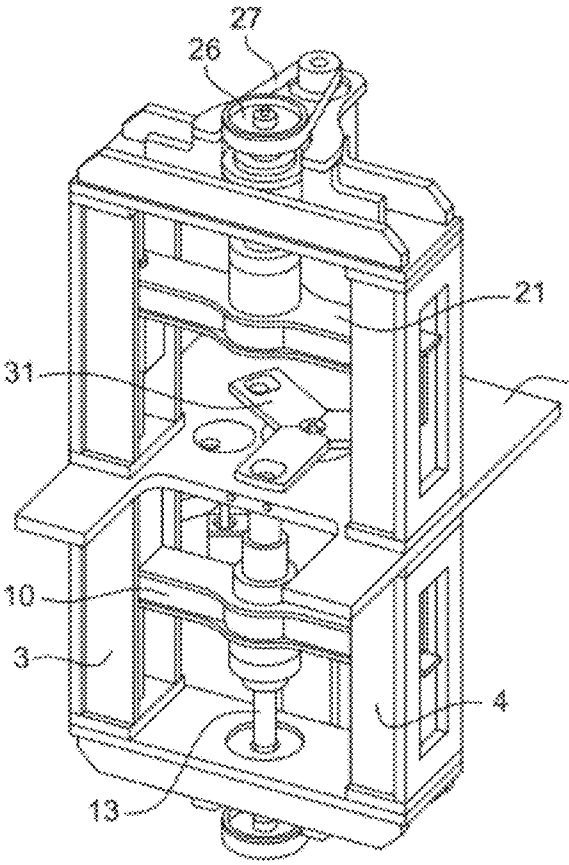
FIG. 3 is a diagrammatic perspective view of a second embodiment of the invention employing two ball or roller screws, actuating the lower punch and the upper punch respectively.
Figure 4:
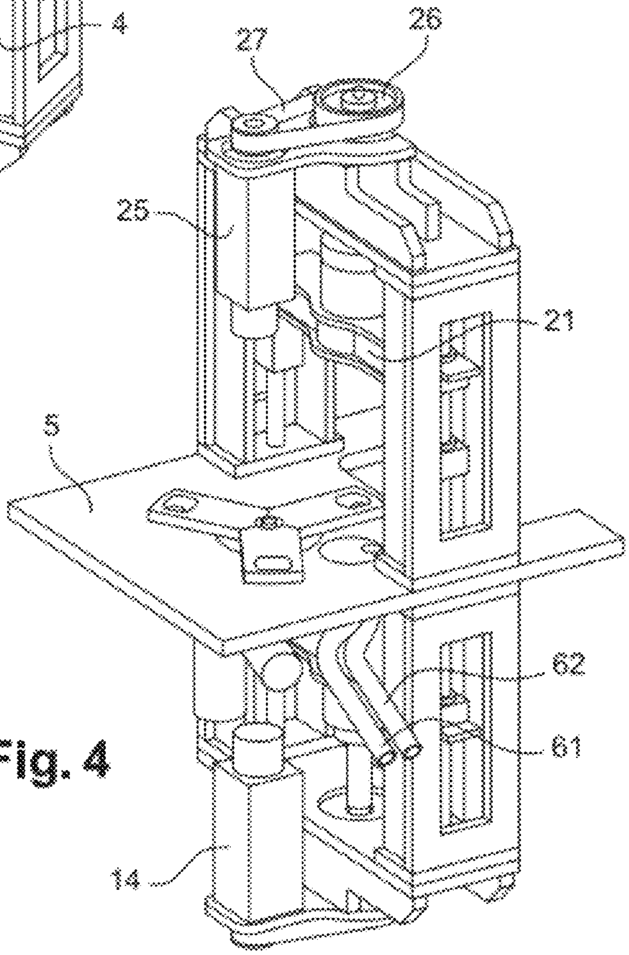
FIG. 4 is a view similar to FIG. 3 seen from another angle.
Figure 5:
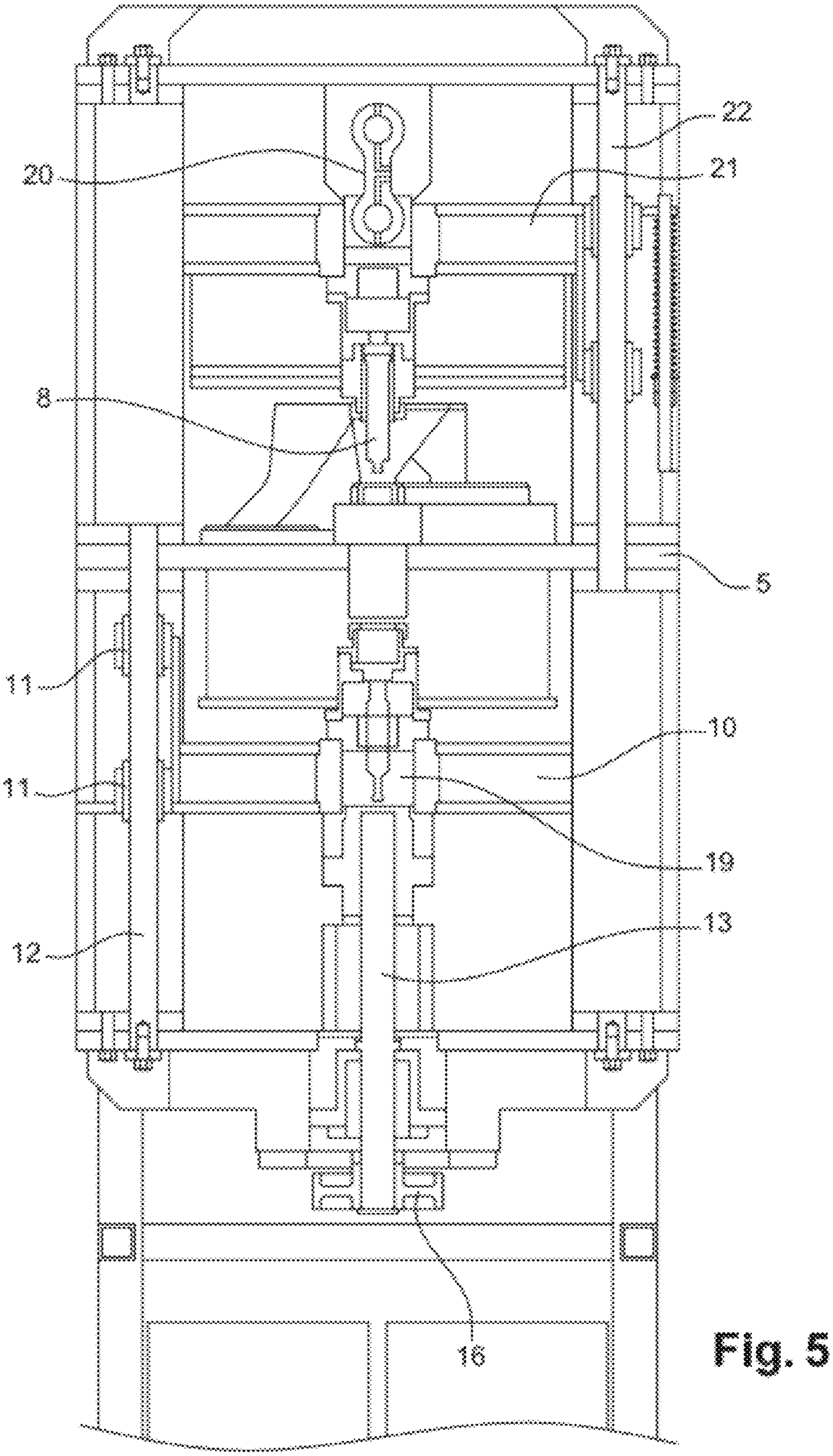
FIG. 5 is a diagrammatic view in transverse cross-section of the facility in FIGS. 1 and 2.

FIGS. 3 and 4 are views similar to FIGS. 1 and 2, although the movement of the upper punch (8) is, in this particular embodiment, also performed by a ball or satellite roller screw of the same type as the screw (13) driving the lower punch in translation. This more expensive embodiment brings a large number of advantages in terms of control and simulation of manufacturing presses to the symmetrical movements.

To this end, this screw (not shown so as not to overload the figure) is rotated by means of a brushless electric motor (25) actuating a pulley (26) by means of a toothed drive belt (27).

The advantage of actuating the lower punch and the upper punch by a ball or roller screw lies in the fact of getting closer to the simulation of so-called rotary presses. Indeed, on such rotary presses, compression is achieved simultaneously by the lower and upper punches. In the invention, the fact of employing a motorised screw to provide the movement of the lower punch and the upper punch makes it possible to be in the same configuration and to have the same motions as a rotary press.

By combining the precise force control resulting from the use of ball or roller screws, the programming of the brushless motor using a variator, and the analysis and anticipation of changes over time in the force exerted during compression and/or the movement of the punches allowed by the measurement elements (force and movement sensors), the models employed by the facility of the invention may either fully simulate the behaviour of industrial manufacturing machines (traditionally controlled in movement on rotary presses), or compress using force as the only element of control so as to give a tablet density independent of the variations inherent in filling. These results are particularly innovative and bring a large number of advantages in terms of developments, help with tablet production and the property thereof with no loss of initial powder.

Additionally, the motions of the upper and lower punches are controlled in terms of position or force or alternately in terms of position and force by means of external control electronics, promoting simulation. Rotary manufacturing machine simulation using these two control principles is then possible.

Figure 7:
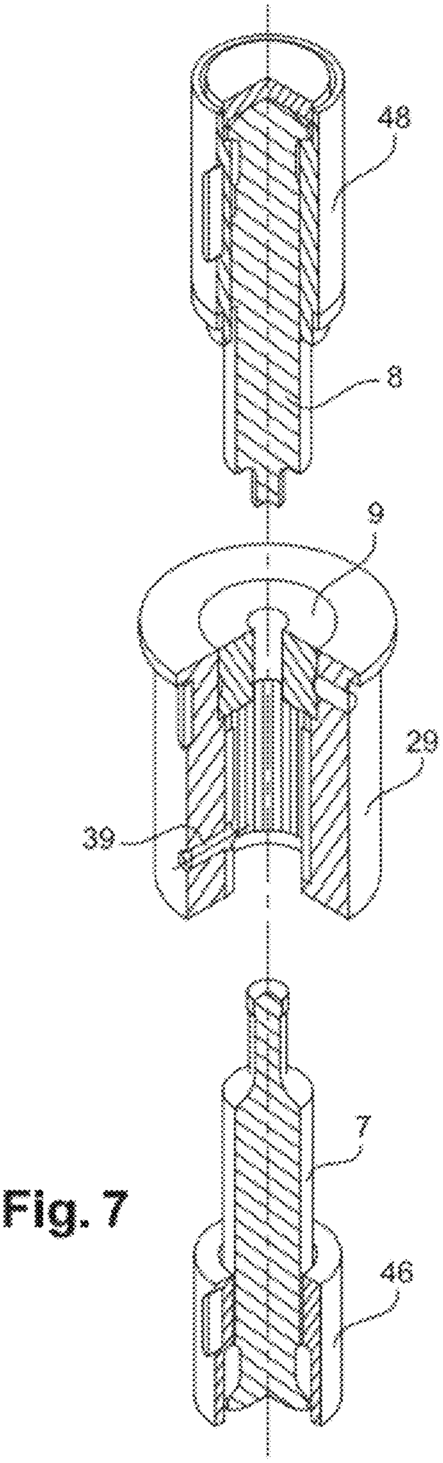
FIG. 7 is a diagrammatic view showing the engagement of the lower and upper punches with the die.

The engagement of the lower (7) and upper (8) punches with the die (9) has been shown in FIG. 7. The die is detachable, and is received in a die-holder tool (29) secured to the table (5). The lower (7) and upper (8) punches respectively are for their part each received in a lower (46) and upper (47) adaptor respectively, allowing the interchangeability thereof as a function of the dimensions of the die employed.

The full advantage of the facility in accordance with the invention may now be understood. Firstly, and particularly in relation to FIGS. 1 and 2, it is easy to grasp the technological simplicity of this facility through the use of a single downward compression and not by the dual actuation of the lower and upper punches, since also in this embodiment, the upper punch performs, as already stated, only a counter-reaction function.

The advantage can also be seen of guiding the upper and lower carriages respectively at the lateral guide pillars so that all systems of guiding the actual punches, which are tricky to implement, can be dispensed with. Thus, a straightforward adjustment at the structural design stage means that any further guide adjustment of the punch or punches at the die can be dispensed with.

Moreover, by using an adapted supply system, it becomes easily possible to produce solid single layer, bi-layer or tri-layer products, something which could not be done effectively and straightforwardly hitherto, and particularly with intermediate compression of each of the layers.

What is claimed is:

1. A facility for using one or more powder materials to produce a solid product having multiple layers, including:

a supply of at least one powder material;

a die for receiving said powder material and shaping the solid product to be produced, said die secured in a reversible manner to a die-holding table secured to a frame of the facility;

an upper punch and a lower punch, wherein said punches are translatable and engage with one another at said die to compress the powder material and produce the solid product;

wherein the lower punch is connected to a system of uncoupling members that provide movement of the lower punch, said system being provided with a brake for limiting the travel of said lower punch in the downward direction to keep said lower punch in contact with the powder material contained in the die when producing the solid product having multiple layers to avoid generation of additional compression during the receipt of powder material in the die during intermediate filling phases for each layer of the product; and wherein said system of uncoupling members further comprises an adaptor having a hole, said hole of said adaptor having at least first and second sections, said first and second sections each having a diameter, said diameter of said second section larger than said diameter of said first section, and said lower punch in sliding contact within said first section and having a stop portion at a bottom end, said stop portion having a third diameter greater than said diameter of said first section but smaller than said diameter of said second section.

2. The facility as claimed in claim 1, wherein the upper punch is only translatable between up and down positions, said upper punch being static during a compression phase.

3. The facility as claimed in claim 2, wherein the upper punch is translatable by a crank and rod system, the up position being used when supplying the die with the powder material and when ejecting the solid product from the die, and the down position being used during the phases of compaction of the powder product.

4. The facility as claimed in claim 1, wherein the movement of the upper punch is controlled at all times.

5. The facility as claimed in claim 1, wherein the lower punch is translatable at the die by a ball or roller screw actuated by an electric motor.

6. The facility as claimed in claim 5, wherein the lower punch is connected to a translatable lower carriage guided at ball guide pillars mounted in the frame of the facility.

7. The facility as claimed in claim 4, wherein the upper punch is translatable at the die by means of a ball or roller screw actuated by an electric motor.

8. The facility as claimed in claim 5, wherein the electric motor actuating the ball or roller screw is brushless and is coupled to a programmable variator, so as to control and synchronise the movement of the lower punch.

9. The facility as claimed in claim 1, wherein the lower and upper punches are carried by a carrier that incorporates a force sensor for measuring the rate of compression exerted and for regulating the facility.

10. The facility as claimed in claim 1, further comprising one or more linear punch movement measurement sensors for determining the respective positions of the lower and upper punches, to determine the height of filling of the die with powder material and the thickness of the solid product produced.

11. The facility as claimed in claim 10, wherein the motion of the lower and upper punches are controlled in terms of position or force.

12. The facility as claimed in claim 8, wherein the brushless electric motor actuating the ball or roller screw coupled to a programmable variator controls and synchronises the movement of the lower punch.

13. The facility as claimed in claim 10, wherein the motion of the lower and upper punches are controlled by external control sensors.

14. The facility of claim 1 further comprising an annular surface defined by said diameter of said first section and said diameter of said second section, wherein said stop interacts with said annular surface to hold the lower punch within said adaptor.

15. The facility of claim 1 further comprising:

a position sensor contacting a lower surface of said stop to measure the position of said lower punch.

16. An apparatus for producing a product having multiple layers from one or more powder materials comprising:

a frame having a die secured thereto, said die having a hole with a first axis;

a first drive and a second drive;

a first punch and a second punch, said first punch connected to said first drive, said first drive translating said first punch along said first axis;

said second drive connected to an adaptor having a hole, and translating said adaptor along said first axis;

said hole of said adaptor having at least first and second sections, said first and second sections each having a diameter, said diameter of said second section larger than said diameter of said first section, said second punch in sliding contact with said first section and translating along said first axis;

a brake that limits movement of said second punch;

a stop portion at a first end of said second punch, said stop portion having a third diameter greater than said diameter of said first section but smaller than said diameter of said second section.

17. The apparatus of claim 16 wherein a surface of said second punch is in contact with said brake and is parallel to said first axis.

18. The apparatus of claim 16 wherein:

said stop has a height;

said second section has a height;

the height of said second section greater than the height of said stop.

19. The apparatus of claim 18 further comprising the difference in the height of said stop and the height of said second section is approximately 8 mm.

* * * * *